United States Patent [19]

Kanotz et al.

[11] 4,339,298
[45] Jul. 13, 1982

[54] APPARATUS FOR INSULATING RELATIVELY FLEXIBLE CONDUCTORS

[75] Inventors: William M. Kanotz, Baldwin, Md.; John J. Mottine, Jr., Red Bank; Robert F. Staats-Westover, Princeton, both of N.J.; Max K. Wilson, Cockeysville, Md.

[73] Assignee: Western Electric Company, Inc., New York, N.Y.

[21] Appl. No.: 229,434

[22] Filed: Jan. 29, 1981

[51] Int. Cl.³ .................................. B29D 23/05
[52] U.S. Cl. ........................... 156/498; 156/244.12; 156/244.13; 156/244.14; 156/500; 425/71; 425/72 R; 425/113; 425/133.1; 425/392; 425/516

[58] Field of Search .............. 156/244.12, 244.13, 156/244.14, 498, 500; 264/174; 425/71, 72 R, 113, 114, 133.1, 392, 516

[56] References Cited

U.S. PATENT DOCUMENTS

| | | |
|---|---|---|
| 2,920,351 | 1/1960 | Hardesty et al. |
| 3,024,497 | 3/1962 | Hardesty et al. |
| 3,037,068 | 5/1962 | Wessel .................. 174/69 |
| 3,227,786 | 1/1966 | Cohen ................... 264/174 |
| 3,270,977 | 9/1966 | Tillou ................... 242/82 |
| 3,346,921 | 10/1967 | Bunish et al. ........... 425/113 |
| 3,553,042 | 1/1971 | Cocco |
| 3,579,608 | 5/1971 | DeCoste ................. 260/837 |
| 3,699,498 | 10/1972 | Hardesty et al. ......... 339/64 M |
| 3,761,869 | 9/1973 | Hardesty et al. ......... 339/99 R |
| 3,890,416 | 6/1975 | Bauer et al. ............. 264/45.5 |
| 3,946,097 | 3/1976 | Takahashi et al. ........ 264/102 |
| 4,061,461 | 12/1977 | Hessenthaler ............ 425/462 |
| 4,090,763 | 5/1978 | Congdon et al. ......... 339/103 M |
| 4,148,539 | 4/1979 | Hardesty ................ 339/99 R |
| 4,172,106 | 10/1979 | Lewis ................... 264/209 |
| 4,206,011 | 6/1980 | Kanotz et al. ........... 156/498 |

Primary Examiner—Caleb Weston
Attorney, Agent, or Firm—E. W. Somers

[57] ABSTRACT

An extrusion system for covering a flexible conductor (14) with a crystalline thermoplastic elastomer insulating material by tubing the plastic onto the conductor includes a core tube (61) which is mounted in an extruder crosshead (41) such that its free end is positioned within the interior of the extruder die (59). The free end of the core tube is spaced from the die opening a predetermined percentage of the land length of the die. In this arrangement, which has been found to be suitable for a crystalline thermoplastic elastomer having a crystallization initiation temperature which is capable of being substantially near to its melting point temperature, the crosshead and the core tube are arranged to provide a streamlined flow path of the insulating material toward the die opening. Air at a higher pressure than has been used in the past is caused to flow through the core tube to cause the extrudate to balloon outwardly from the conductor for a length of travel to permit adequate crystallization of the extrudate so that when it engages the conductor, it will compress any upstanding metallic burrs. This arrangement substantially inhibits the adherence to and the accumulation of any plastic material on the outer surface of the core tube which would affect the concentric disposition of the insulation cover (18) about the conductor.

5 Claims, 5 Drawing Figures

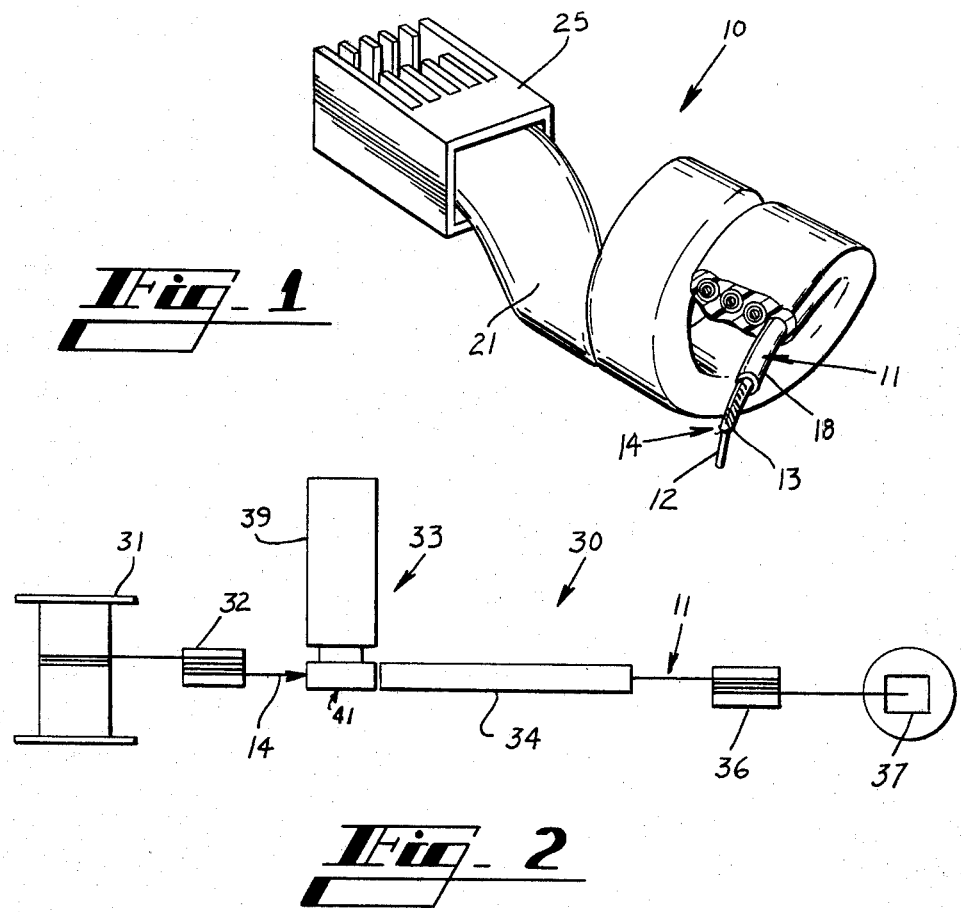
Fig_1
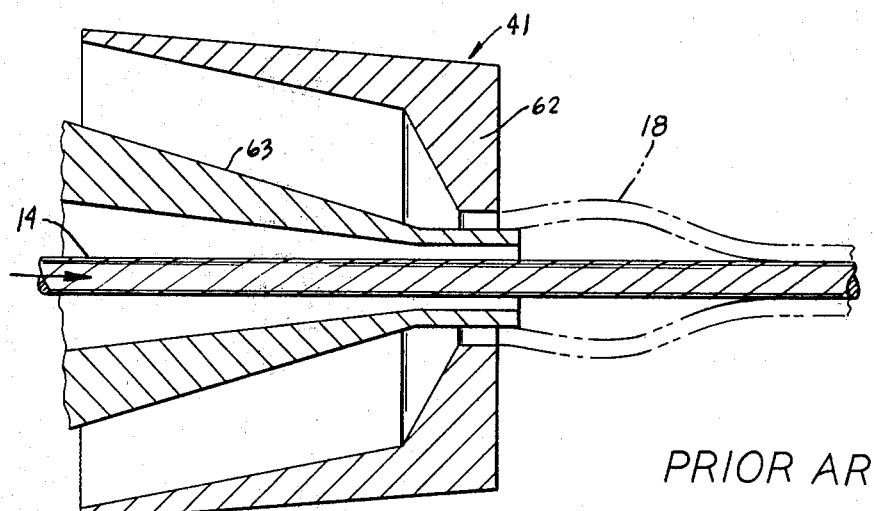
Fig_2
PRIOR ART
Fig_4

APPARATUS FOR INSULATING RELATIVELY FLEXIBLE CONDUCTORS

TECHNICAL FIELD

This invention relates to apparatus for insulating relatively flexible conductors. More particularly, it relates to apparatus for covering a conductor which comprises a plurality of tinsel ribbons which are wrapped about a filamentary core, with a crystalline thermoplastic elastomer material.

BACKGROUND OF THE INVENTION

A telephone cord which connects a telephone handset to a telephone base generally comprises a polymeric core having a plurality of tinsel ribbons wrapped helically thereabout. These cords may have either a linear configuration or may be wound in a helical configuration comprising a plurality of convolutions, the latter being referred to as a retractile or spring cord. Telephone cords are well disclosed in the prior art such as, for example, U.S. Pat. No. 3,037,068 issued May 29, 1962 in the name of H. L. Wessel, and in U.S. Pat. Nos. 2,920,351 and 3,024,497 issued on Jan. 12, 1960 and Mar. 13, 1962 respectively in the names of E. C. Hardesty and D. L. Myers, all incorporated by reference hereinto.

In the past, tinsel conductors were covered with a nylon knit and then insulated with an extruded polyvinyl chloride (PVC) composition. A plurality of individually insulated conductors were jacketed with a plasticized PVC composition. See priorly mentioned U.S. Pat. No. 3,037,068.

In a somewhat recently introduced cord connection arrangement, which is referred to as modularity, miniature plugs are connected to each end of a line or spring cord to facilitate attachment to jacks in telephone instruments and in wall outlets. For example, see U.S. Pat. Nos. 3,699,498 and 3,761,869 issued Oct. 17, 1972 and Sept. 25, 1973 respectively in the names of E. C. Hardesty, C. L. Krumreich, A. E. Mulbarger, Jr. and S. W. Walden and in U.S. Pat. No. 4,148,359 issued Apr. 10, 1979 in the name of E. C. Hardesty, all incorporated by reference hereinto.

With the introduction of modularity, it became necessary to use a different cord construction because of a need for a smaller cross-section to be compatible with the plugs. In order to reduce the size of the insulated conductor, the plasticized nylon covering over the served tinsel was replaced with a crystalline thermoplastic elastomer as disclosed and claimed in U.S. Pat. No. 4,090,763 issued on May 23, 1978 in the names of W. I. Congdon, J. J. Mottine and W. C. Vesperman, which is incorporated by reference hereinto. A material such as that disclosed and claimed in the above-identified Congdon et al application is available commercially from E. I. duPont Company under the trade name HYTREL ® polyester elastomer.

Typically, insulation over tinsel conductors is formed by an extrusion process which is referred to as tubing such as is disclosed, for example, in U.S. Pat. No. 3,553,042 issued on Jan. 5, 1971 in the name of E. R. Cocco and which is incorporated by reference hereinto. The tubing process provides that a plastic extrudate which is to form the insulation encloses but is spaced from the tinsel conductors to provide for relative movement therebetween, thus adding to the flexibility and to the life of the telephone cord. In a typical tubing operation, the downstream end of a core tube in an extruder crosshead is at least flush with or extends beyond the vicinity of a die opening.

The prior art also shows techniques for controlling the engagement of the tubed plastic extrudate with the core being enclosed. In U.S. Pat. No. 4,206,611, which issued on June 3, 1980 in the names of W. M. Kanotz, W. A. Lockhart, George F. Piper, W. C. Vesperman and M. K. Wilson and which is incorporated by reference hereinto, an extruded tubular covering is held out of contact with an advancing conductor until the extrudate becomes sufficiently form-sustaining by suitable crystallization. Then, when the crystallized insulation is drawn down on the conductor, any tinsel burrs which protrude outwardly are compressed. This results in a conductor having a continuously concentric insulation having a uniform wall thickness.

One problem that has surfaced during the use of HYTREL ® plastic as an insulation cover relates to the extrusion process. The extruder which is shown in above-identified U.S. Pat. No. 4,206,611 includes a typical tubing arrangement in which the nose or free end of the core tube extends slightly beyond the die opening of the extruder crosshead. As the extrudate emerges from the die opening, prematurely crystallized portions of the plastic material which are called crystallites and which may have formed somewhere between the extruder screw and the die opening adhere to the surface of the conventional protruding or flush free end of the core tube. These small portions further crystallize, break off and form lumps in the conductor insulation or they may continue to accumulate and result in large masses adhered to the extruder tooling.

SUMMARY OF THE INVENTION

The foregoing problem of covering a tinsel conductor by tubing a crystalline thermoplastic elastomer has been overcome by the apparatus of this invention in which a conductor which includes a core having a plurality of tinsel ribbons wrapped thereabout is advanced through an extruder that includes a core tube which is recessed within a die opening of the extruder. An insulation cover comprising a crystalline thermoplastic elastomer is extruded into enclosing spaced relation with successive increments of length of the advancing tinsel conductor. The crystalline thermoplastic elastomer is one having a crystallization initiation temperature which is capable of being substantially near to its melting point temperature. In the apparatus for covering the conductor, the core tube is positioned in a die cavity of an extruder crosshead such that a free end of the core tube is within the die opening instead of extending therepast. This prevents any build up of crystallites in the vicinity of the die opening by eliminating potential collection sites for prematurely crystallized portions of the thermoplastic material and avoids defects in the insulation cover.

The thermoplastic material which is moved past the recessed, free end of the core tube flows inwardly toward the advancing conductor, then outwardly from the tinsel conductor for a predetermined time to cool the extrudate and to initiate its crystalline growth. The expansion of the extrudate is effective to molecularly orient the thermoplastic material which enhances its crystalline growth. Then the insulation cover is drawn down concentrically about the tinsel conductor while the plastic material which comprises the insulation cover is further cooled.

BRIEF DESCRIPTION OF THE DRAWINGS

Other objects and features of the present invention will be more readily understood from the following detailed description of specific embodiments thereof when read in conjunction with the accompanying drawings, in which:

FIG. 1 is a perspective view of a telephone cord which comprises tinsel conductors which are insulated with the apparatus of this invention and showing one end of the cord terminated with a modular plug;

FIG. 2 is a view of an overall manufacturing facility, in schematic form, embodying the principles of this invention for producing insulated tinsel conductors;

FIG. 4 is an enlarged view of a portion of a prior art tubing arrangement; and

DETAILED DESCRIPTION

Figure 3:
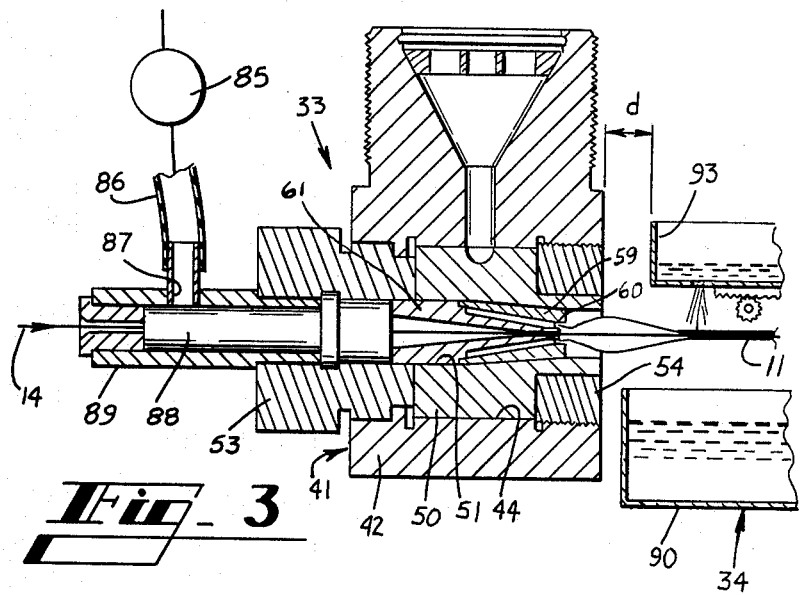
FIG. 3 is an enlarged view of a portion of the apparatus shown in FIG. 2 and showing portions of an extruder crosshead and of cooling facilities.

Referring now to the drawings, and particularly FIG. 1 thereof, there is shown a retractile or spring cord, designated generally by the numeral 10. While the invention is described and shown in terms of conductors which are used in a spring cord, the principles of this invention are applicable generally to the manufacture of cordage which may be used for either a spring or a line cord.

The spring cord 10 is of the type used on telephone instruments and includes a plurality of insulated tinsel conductors 11—11. Each of the insulated tinsel conductors 11—11 includes a nylon multi-filament center core 12 about which a plurality of tinsel ribbons 13—13, made typically from a Phosphor-bronze material, are wrapped spirally to form a tinsel conductor 14. An insulating cover 18 of a suitable plastic material is extrusion tubed over the tinsel conductor 14 to form one of the insulated tinsel conductors 11—11.

The insulated conductor 11 is disclosed and claimed in priorly identified U.S. Pat. No. 4,090,763 and the plastic material which comprises the insulation 18 is a crystalline thermoplastic elastomer. An insulation composition suitable for constructing the cord 10 is available presently from the E. I. duPont de Nemours and Company, Inc. of Wilmington, Delaware under the trade designation HYTREL® polyester elastomer material.

Extrusion of the thermoplastic elastomer composition is affected by extrusion temperatures and screw design since the insulation composition is characterized by rapid changes in melt viscosity and melt strength with slight variations of polymer temperature. Moveover, the material undergoes a rapid transition between liquid and solid phases. These characteristics could result in non-uniform wall thickness and polymer flow pulsations unless suitable control is exercised.

The insulation 18 is tubed over the tinsel conductor 14 such that an air-induced space between the tinsel conductor and the insulation allows the conductor to move freely within the insulation thereby reducing conductor fatigue. With an average conductor outside diameter of about 0.05 cm and the size limitation imposed by a modular-terminated cord 10, the tubular insulation 18 has an outside diameter typically on the order of 0.09 cm. The criticality of the outside diameter coupled with approximately a 0.002 cm air space, necessitates a tubular wall thickness of about 0.019 cm. This relatively thin wall construction mandates that the insulation material possess excellent mechanical strength, such as, for example, cut-through resistance, suitable hardness and suitable tensile and compressive strengths.

The crystalline plastic material which comprises the insulation 18 is one whose crystallization nucleation or initiation temperature is capable of being substantially near to its melting point temperature. The insulation 18 is characterized by crystalline growth within a defined temperature range when cooled below the melt point temperature of the thermoplastic elastomer which is in the range of approximately 218° C. to 220° C. The crystalline growth makes possible the extrusion of a tubing about the irregular tinsel conductor while developing the strength and rigidity so that when the tubed insulation is moved into proximate engagement with the conductor, it is capable of compressing any burrs upstanding from the tinsel ribbons.

A plurality of the insulated tinsel conductors 11—11 are arranged in parallel, nontwisted, contiguous relationship with respect to each other and enclosed in a jacket 21 (see FIG. 1) which is comprised, for example of a plasticized polyvinyl chloride composition. Subsequently, the cord 10 is completed by attaching a modular plug 25 to one or both ends thereof.

Referring now to FIG. 2 of the drawings, there is shown a simplified schematic view of a system designated generally by the numeral 30 for producing tinsel conductors 11—11 covered with the insulation 18. The system 30 includes a supply 31 of a tinsel conductor 14, an accumulator 32, an extruder, designated generally by the numeral 33 for tubing the insulation cover 18 over the tinsel conductor 14, a cooling system 34, a capstan 36 and a takeup 37.

The supply 31, the accumulator 32, the cooling system 34, the capstan 36 and the takeup 37 are all of conventional design and are well known in the art. The takeup 37 for example, is a barrel takeup such as that shown for example, in U.S. Pat. No. 3,270,977, which is incorporated by reference hereinto.

Referring now to FIGS. 2 and 3 of the drawings, it is seen that the extruder 33 includes a barrel 39 in which is mounted a screw of the type for example shown in U.S. Pat. No. 3,579,608, incorporated by reference hereinto, which is rotated by suitable source of power (not shown) for the purpose of forcing the thermoplastic elastomer material through an extruder crosshead, designated generally by the numeral 41. The crosshead 41 comprises a body member 42 provided with an opening which forms a continuation of the bore in the barrel 39 and which communicates with a cylindrical bore 44 formed in the body member 42 transversely with respect to the barrel.

A cylindrical tool holder 50 having a central bore 51 which extends coaxially with respect to the bore 44 is removably mounted in the body member 42 by a back head nut 53 and an adapter nut 54. The tool holder 50 supports a die 59 having a land 60 and mounts a core tube 61 in axial alignment with the die 59. Typically, the length of the land 60 as measured in a direction along the path of travel of the conductor 14 is in the range of 0.20 cm to 0.25 cm.

The tool holder 50 is designed to deflect insulation material 18 from a direction flowing downwardly as viewed in FIG. 3 to a direction flowing to the right around the core tube 61 and through the die 59 to form concentrically the covering 18 around the tinsel conductor 14 being advanced therethrough.

In a conventional tubing operation, the insulation 18 is drawn down on the conductor 14 as the conductor is advanced out of the extruder 33 since the conductor is being advanced at a higher rate than that at which the extrudate is issuing from the extruder. The polymer melt emerging from the extruder 33 is referred to as the extrudate. See, for example, page 4 of Engineering Principles of Plasticating Extrusion by Z. Tadmor and I. Klein published by Van Nostrand Reinhold Co. and copyright 1970, and pages 53 and 253 of Processing of Thermoplastic Materials edited by E. C. Bernhardt and published by Van Nostrand Reinhold Co. copyright 1959, both of which texts are incorporated by reference hereinto.

In the tubing operation, the insulation 18 is drawn on the advancing tinsel conductor 14 which occasionally has thin slivers of tinsel material, metal burrs or lumps protruding outwardly from the periphery thereof. In order to prevent these slivers or burrs from intruding into the insulation 18 being drawn down thereonto causing protuberances in the outside surface of the insulated conductors 11—11, the draw down of the insulation 18 about the conductor 14 is controlled. The control is to be obtained by maintaining the extrudate, which has a relatively high melt viscosity and melt strength, spaced out from the tinsel conductor 14 for at least a predetermined time (see FIG. 4). The extruder 33 is designed to tube the insulation 18 over the conductor 14 as the conductor is advanced out of the extruder, in such a way as to provide an air space between the insulation and the tinsel conductor.

The plastic material which comprises the insulation 18 is a crystalline material in which crystalline growth occurs in the range of about 60° C. to about 216° C. In order to resist disfiguration of the outward configuration of the insulated conductor 11 by irregularities in the tinsel conductor 14, it is most advantageous to provide for substantial crystalline growth and development of sufficient melt strength in the plastic material prior to the plastic material being caused to assume its ultimate position relative to the tinsel conductor. This may be accomplished by extruding the plastic material at a temperature slightly above but as close as possible to its melting point, i.e. 218° C. to 220° C. and by spacing the extrudate from the tinsel conductor 14 (see FIG. 4) for a predetermined time sufficient to obtain a desired crystal growth and development of melt strength. See priorly identified U.S. Pat. No. 4,206,611. Typically the temperature of the melt at the extruder die opening is about 224° C. which although just a few degrees less than in the extruder barrel increases the melt viscosity because of the steepness of the curve of viscosity versus temperature of the composition which comprises the insulation 18.

It has been found that for insulated conductors 11—11 of the size contemplated for modularity, a normal tubing operation is not adequate to control the dimensions of the insulation 18 and provide a specific wall thickness. Moreover, a HYTREL ® plastic material tends to vary in consistency thereby necessitating a greater degree of control. As the insulation extrudate is moved from a prior art die 62 and a core tube 63 arrangement which is shown in FIG. 4, crystallites, i.e. prematurely crystallized portions, of it accumulate on that end of the core tube which protrudes from the die. These portions of the extrudate cool and further crystallize and break loose to form lumps in the conductor insulation or continue to accumulate or form large masses of plastic on the tooling which disrupt the polymer flow and result in a core break. The apparatus of this invention eliminates the accumulation of these plastic crystallites.

Figure 5:
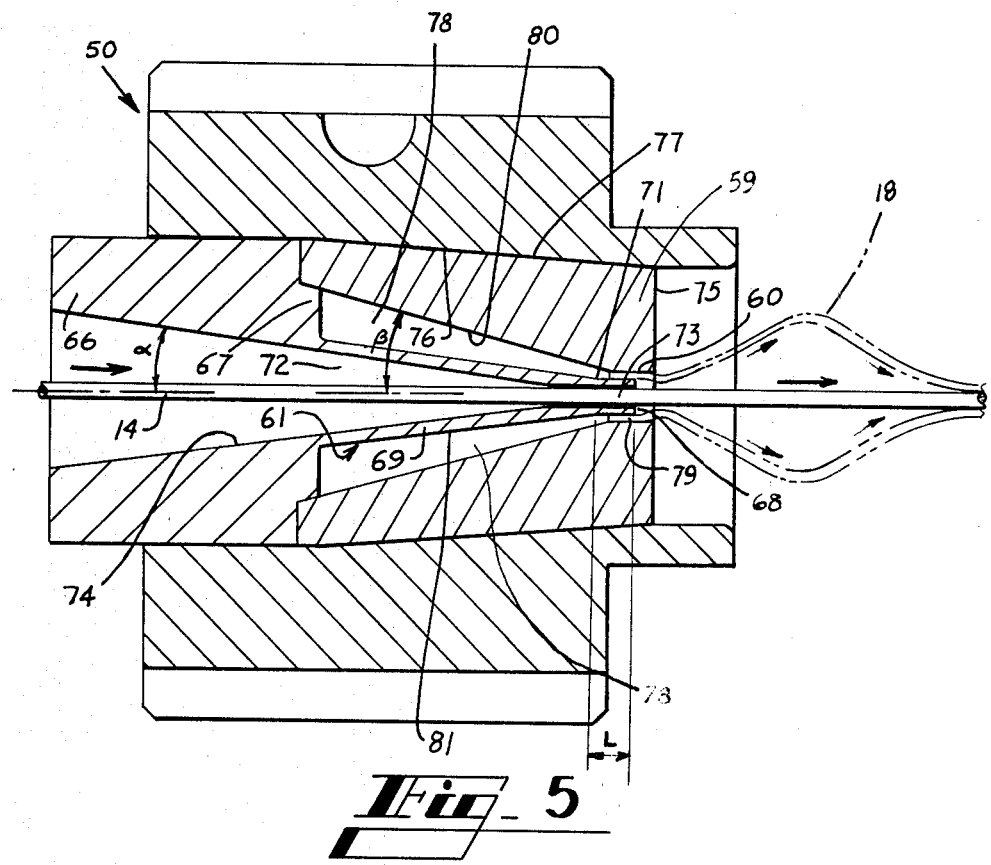
FIG. 5 is an enlarged detail view of a portion of the extruder die and core tube of this invention.

Referring to FIG. 5, there is shown in detail the core tube and die arrangement of this invention. The core tube 61 includes a stepped, tapered conical member having an enlarged base portion 66, a second portion 67 having a reduced diameter but with outside walls thereof being generally parallel to the centerline of the core tube 61 and a tapered conical portion 69 finally culminating in a cylindrical portion 71. The core tube 61 is supported in the cavity 51 in the crosshead 41 such that a free end 68 of the cylindrical portion 71 does not extend to an outwardly facing surface 75 of the crosshead to which the die 59 opens. The core tube 61 is constructed with a tapered bore 72 extending through the portions 66–67 and 69 and defined by an inner surface 74. Typically an angle $\alpha$ between the inner surface 74 and the centerline of the core tube 61 is in the range of about 7° to 9°. The bore 72 communicates with a cylindrical bore 73 which opens to the interior of the die 59 along the land 60 thereof.

The die holder 50 is constructed with a cavity 76 which is defined by a side or bearing wall 77. The die 59 is supported in engagement with the surface 77 and includes a cavity 78 that has a frustoconical configuration and that converges at some predetermined angle toward the land or throat 60 adjacent an opening 79 of the die 59. Typically, an angle $\beta$ formed between a line of generation of a wall 80 which defines the cavity 78 and the centerline of the core tube 61 is on the order of magnitude of 10° to 15°.

The plastic material flows between the wall 80 of the die cavity 78 and a frustoconical surface 81 of the core tube 61 which are spaced apart in a converging direction (see FIG. 5). The plastic material flows at a high velocity to the end face of the core tube 61 and the pressure of the material on all sides of the portion of the core tube is balanced. The conductor 14 is guided from the core tube 61 substantially in alignment with the cylindrical passage 79 of the die 59 so that it is centered generally within the extrudate as it is advanced out of the cylindrical bore 73 and the insulation cover material is extruded through the cylindrical passage in the die.

Turning again to FIG. 5, where there is shown an enlarged view of the downstream portion of the extruder crosshead 41 in the vicinity of the die opening, it will be recalled that the core tube 61 of the apparatus of this invention has a free or unsupported end which is positioned within the land of the die. More particularly, the free end of the core tube 61 is positioned so that it is in the range of 33 to 50% of the land length "L" of the die 59 from the external face 75 of the die.

This arrangement which is a departure from the usual prior art tubing arrangements such as is shown in FIG. 4, results in a continuously concentric insulated conductor. The recessing of the tip of the core tube 61 within the land 60 of the die 59 prevents any accumulation of extrudate since any plastic which engages the surface of the core tube is continuously wiped therefrom. Crystallites may continue to form on the external surface of the core tube but since they do so in the land length of the die which is the zone of highest pressure in the crosshead, they are continuously and immediately wiped off. In other words, the ability of the plastic to adhere to and to accumulate on the surface of the core tube is substantially inhibited because of the elimination of potential collection sites.

The core tube and die arrangement of this invention is also a departure from the prior art with respect to the land 60 of the die 59. Generally, the lands of dies which are used to extrude crystalline materials over relatively small diameter strands have a length, e.g. about 0.10 cm, which is substantially less than that of the land 60 of this invention. Because crystalline materials tend to slough off on the land surface as they are moved through the die, the land length has been relatively small in prior art arrangements. However, in the apparatus of this invention, the crystallization of the plastic material is about half complete as it is moved through the land 60 which avoids any build up. Advantageously, this stabilizes the flow and reduces turbulence in the vicinity of the die opening notwithstanding the underflush position of the free end of the core tube 61.

The use of an underflush core tube and die arrangement for tube extruding a crystalline thermoplastic elastomer produces unexpected results. Not only are collection sites for prematurely crystallized portions of the crystalline thermoplastic elastomer which comprises the insulation 18 eliminated, but the extrudate does not tear or break apart as it passes the tip of the core tube. As the plastic material leaves the passageway between the tip of the core tube 61 and the die wall, it flows inwardly for a short distance before it is ballooned outwardly (see FIG. 5). Moreover, the extrudate is required to accelerate from its flow in the extruder which is at a rate of about 66 m/min to about 820 m/min adjacent the cooling trough 34. Under these conditions, it would be expected that this arrangement would cause the plastic to snap apart. However, the system of this invention results in a smooth uninterrupted flow of the plastic first inwardly toward the advancing conductor 14 and then outwardly to maximize crystalline growth before it forms the insulation cover about the conductor.

The initial over-spacing of the HYTREL ® insulation from the tinsel conductor is accomplished with the core tube arrangement shown in FIG. 3 in which the core tube 61 includes the tapered cavity 72 at the upstream end thereof. A gaseous medium such as, for example, air at a pressure of about $1.4 \times 10^5$ newtons/m² is introduced through a flow rate meter 85. The air is introduced at a volume rate of about 4.7 to $6.3 \times 10^{-5}$ m³/sec through a tube 86 into an opening 87 which communicates with a passageway 88 through a member 89 disposed concentrically with respect to the centerline of the crosshead 41 and into the tapered cavity between the walls of the cavity and the tinsel conductor 14 being advanced centrally therethrough. The air which is driven under pressure toward the downstream or exit end of the extruder crosshead 41 enters the cylindrical portion of the core tube 61 between the tinsel conductor 14 and the walls of the core tube and finally exits out from the extremity of the core tube which protrudes into the opening 79.

The effect of the construction of the core tube 61 with respect to the die opening 79 in cooperation with the air pressure causes the HYTREL ® insulation to "balloon" or expand outwardly from the tinsel conductor as shown in FIG. 5. Then, after the conductor 14 is advanced through a predetermined distance at a specific line speed which is sufficient for crystalline growth of the HYTREL ® insulation to occur, the polymer is drawn down about the conductor.

Crystalline polymers such as, for example, the HYTREL ® copolymer exhibit improved strength and flexibility when they have been treated in a manner to orient the polymer molecules. This result which is derived from molecular orientation and which enhances the crystallizeability of the crystalline thermoplastic elastomer is referred to as orientation-enhanced crystallizeability.

The introduction of the air into the core tube 61 to expand the insulation cover 18 for a short distance downstream of the die opening 79 stresses the insulation. This causes a molecular orientation to occur within the copolymer material. It should be noted, however, that the use of air to expand and molecularly orient the copolymer occurs by extruding the copolymer at a temperature slightly above, but as close as possible to, the melting point of the copolymer extrudate. If the copolymer extrudate was extruded at a temperature substantially higher than the melting point of the copolymer, crystalline growth would be inhibited and any attempt to expand the extrudate would most likely rupture the insulation 18.

The introduction of the air into the core tube 61 to expand the extrudate outwardly from the tinsel conductor 14 advantageously cools the extrudate below the melt temperature at the die opening 79. This is of assistance in causing the temperature of the polymer to decrease to within the aforementioned temperature range wherein crystalline growth occurs.

The crystalline insulation material has suitable strength to overcome any upstanding tinsel slivers and to compress them toward engagement with the configuration of the tinsel conductor. Moreover, as the insulation 18 assumes its generally final positions relative to the tinsel conductor with a wall, e.g. 0.002 cm air space therebetween, it has sufficient melt strength to stretch over any burrs or lumps of metal of considerable size which may occur on the tinsel without rupture. Advantageously, this results in a continuous reliably configured insulated tinsel conductor 11 which obviates the necessity for a rewind operation.

With the underflush positioning of the core tube 61, it has been found that higher air volumetric flow rates must be injected between the core tube and the extrudate than in prior art arrangements in order to insure the movement of the extrudate out of the die opening. An increased volumetric flow rate for the injected air provides advantages with respect to the molecular orientation of the crystalline material. The increased pressure causes the cone of extrudate to be held out of engagement with the conductor 14 for a longer period of time which results in an improved crystalline structure having increased strength with which to compress any tinsel flaws. Further, the increased air pressure becomes important to obtain a uniform melt which causes the crystallization rate to become more uniform.

Since the temperature of the insulation composition is dropped adjacent the die opening in order to maximize the melt strength of the extrudate, the flow path in the extruder crosshead should be somewhat streamlined. It should be observed from FIG. 5 that the configuration of the crosshead adjacent the die opening cooperates with the core tube 61 to provide a streamlined flow path for the plastic insulating material. With the angle α of about 7° to 9° between the centerline of the core 61 and the outer surface 81 of the core tube, it has been found that the angle β between a line parallel to the centerline of the core tube 61 and the surface 80 of the die should be in the range of about 15° to 30° for an elastomer having a relatively high degree of crystallization. The velocity of the plastic increases as it approaches the die 59 which contributes to the wiping action along the tip of the core tube 61 and the inhibiting of any build up of crystallites thereon.

The apparatus which embodies the principles of this invention optimizes the crystalline growth and insures that a substantial percentage of the total growth occurs prior to takeup in order to avoid the material acquiring a permanent set corresponding to the configuration of the takeup barrel 37. The air injection is effective to cool the copolymer and promote crystalline growth as well as to orient the molecular structure of the copolymer by subjecting it to strain, which enhances the crystalline growth. Moreover, without the use of air injection, the extrudate at a temperature substantially in excess of the melting point of the copolymer would collapse on the tinsel with no air space, possibly with bubble structures having formed and with non-uniform circular configurations and diameter variations. The cold water quench causes a rapid cooling which causes further crystallization to develop in the polymer material. Subsequently, as disclosed in U.S. Pat. No. 4,206,611, the insulation is cooled more slowly to continue the growth of the oriented crystallization structure.

Subsequently, the insulated tinsel conductor 11 is advanced along a path through the treating facilities 34 (see FIGS. 2 and 3) whereat the insulation is treated with a fluid, e.g. water, to cause the insulation to be cooled in a predetermined manner. The cooling facility 34 typically comprises a trough 90 in order to treat and anneal the insulation covering the tinsel conductor 14.

The upstream end of the water trough 93 is spaced a predetermined distance, "d", from the downstream end of the extruder crosshead plug 54. The cooling system 34 is mounted so that it may be moved closer or farther from the extruder 33. Changing "d" changes the outside diameter of the insulated conductor 11 and the length of the cone of drawdown, and affects the crystallization rate of the copolymer.

It is to be understood that the above-described arrangements are simply illustrative of the invention. Other arrangements may be devised by those skilled in the art which will embody the principles of the invention and fall within the spirit and scope thereof.

What is claimed is:

1. An apparatus for tube extruding a crystalline thermoplastic elastomer about a relatively flexible conductor, said apparatus including:
   an extrusion head having a passage therethrough;
   an extrusion die mounted at one end of said extrusion head, said die having an exit port which communicates through a cylindrical land, having a length L, with a cavity of said extrusion die, said die cavity including a generally frustoconical shaped portion which converges toward said land;
   means for advancing successive increments of a length of a relatively flexible conductor along a path which is aligned with an axis of said cavity of said die;
   a core tube having a passageway through which the conductor is advanced, said core tube being mounted in said cavity of said die with said passageway in axial alignment with said exit port of said die for guiding the conductor toward said exit port and with a free end of said core tube being positioned within said land of said die and spaced from said exit port a distance which is in the range of 0.3 to 0.5 L, said die cavity having an inner surface which cooperates with an outer surface of said core tube to define a flow passage that communicates with said exit port;
   means for moving while working the thermoplastic elastomer along said flow passage and through said exit port of said die as an extrudate which is spaced from the conductor adjacent to said free end of said core tube;
   means for expanding the extrudate outwardly from the conductor and for cooling the extrudate to orient molecularly the thermoplastic elastomer and enhance its crystalline growth; and
   means for controlling said advancing means and said means for expanding the extrudate outwardly to cause the extrudate to be drawn down concentrically about the conductor after a predetermined time to form an insulation cover which can move relative to the conductor with the molecularly oriented crystalline elastomer being effective to provide an insulated conductor having a substantially uniform diameter.

2. The apparatus of claim 1, wherein said means for expanding the thermoplastic extrudate outwardly from the conductor includes means for introducing a gas into said core tube and for causing the gas to flow through said core tube and to be controlled relative to a speed at which the conductor is advanced to space apart the extrudate from the conductor a distance which is sufficient to molecularly orient the crystalline thermoplastic elastomer.

3. The apparatus of claim 2, wherein said gas which is directed into said core tube has a pressure of about $1.4 \times 10^5$ newtons/m².

4. The apparatus of claim 1, wherein twice the angle which is formed between a line of generation of the outer surface of said core tube and an axis of said passageway of said core tube along which the conductor is advanced is in the range of about 14° to 18°.

5. The apparatus of claim 1, wherein said land of said die has a length of about 0.20 cm to about 0.25 cm as measured in a direction along which the conductor is advanced.

* * * * *